Oct. 29, 1957  L. R. EVANS  2,811,485
PROCESS FOR CHLORINATING DIMETHYL ETHER
Filed Sept. 29, 1954

INVENTOR.
Latimer R. Evans
BY
Griswold & Burdick
ATTORNEYS

United States Patent Office 2,811,485
Patented Oct. 29, 1957

2,811,485
PROCESS FOR CHLORINATING DIMETHYL ETHER

Latimer R. Evans, Las Cruces, N. Mex., assignor to The Dow Chemical Company, Midland, Mich., a corporation of Delaware Application September 29, 1954, Serial No. 459,173

4 Claims. (Cl. 204—158)

This invention concerns an improved process for the production of chlorinated dimethyl ethers from dimethyl ether and chlorine. It relates more particularly to an improved process for chlorinating dimethyl ether.

It is known that dimethyl ether and chlorine combine in direct sunlight with burning, or with explosive violence. The reaction is capable of forming a number of products, i. e. the several chlorine substitution products and decomposition products, and a mixture of products is usually obtained. The velocity of the reaction renders the latter difficult to control so as to obtain desired products in good yield. Unless controlled to avoid the possibility of an explosion occurring, the reaction is hazardous to carry out. It has been proposed to slow down the reaction by carrying out the chlorination in diffused sunlight, or by chlorinating the dimethyl ether in the presence of an inert gaseous diluent, e. g. carbon dioxide, or in admixture with a liquid solvent such as carbon tetrachloride, or chloromethyl methyl ether. The methods heretofore proposed for the chlorination of dimethyl ether have not been entirely satisfactory. Burning of the gases frequently occurs when carrying out the chlorination of dimethyl ether in diffused sunlight even under carefully controlled conditions when employing the reactants in equimolecular proportions. The employment of carbon dioxide as a diluent gas in the vapor-phase chlorination of dimethyl ether renders it difficult to separate and recover the chlorinated product. Carrying out of the chlorination in an inert liquid solvent such as carbon tetrachloride involves the additional operations of handling and recovery of the solvent from the chlorinated product, while the employment of a liquid solvent which is a product of the chlorination, e. g. chloromethyl methyl ether, usually results in substantial chlorination of said solvent and is undesirable. The difficulties heretofore experienced in the chlorination of dimethyl ether render it apparent that there is need of a method for carrying out the reaction of chlorine with dimethyl ether so that the velocity of the reaction and the type of products obtained in the chlorination can readily be controlled.

It is a primary object of the invention to provide an improved process for the production of chlorinated dimethyl ethers from dimethyl ether and chlorine. Another object is to provide a process for carrying out the reaction of chlorine with dimethyl ether so that the type of products obtained in the chlorination can readily be controlled. A further object is to provide a process for carrying out the chlorination of dimethyl ether in continuous manner. A specific object is to provide a process for chlorinating dimethyl ether to obtain chloromethyl methyl ether. Other and related objects may appear from the following description of the invention.

According to the invention the chlorinated dimethyl ethers are prepared from dimethyl ether and chlorine, and the type of products obtained in the chlorination can readily be controlled by carrying out the chlorination of dimethyl ether under the following set of conditions:

(a) Feeding dimethyl ether vapors and chlorine gas into admixture with one another under non-reactive or substantially non-reactive conditions, e. g. forming a uniform or substantially uniform gaseous mixture of the dimethyl ether and the chlorine in the absence, or substantial absence, of light or a catalyst, preferably at room temperature or below, in proportions as hereinafter defined.

(b) Subjecting the gaseous mixture of reactants to the catalytic action of an amount of light sufficient to initiate chlorination of the dimethyl ether without burning of the gases and completing the chlorination in the absence or substantial absence of light.

(c) Carrying out the chlorination in continuous manner at temperatures between 80° and 220° C., preferably from 90° to 120° C., and in the absence or substantial absence of a liquid medium and in the absence of solvents or diluents other than the reactants or products involved in the reaction.

It has been found that by carrying out the chlorination of dimethyl ether in continuous manner under the reaction conditions just stated employed the dimethyl ether in excess, i. e. in amount corresponding to as least 2, preferably from 2 to 10, gram molecular proportions of the dimethyl ether per gram molecular equivalent proportion of the chlorine, in the initial mixture of gaseous reactants, the chlorination proceeds smoothly and the reaction can readily be controlled to obtain desired chlorination products.

The overall molar ratio of dimethyl ether to chlorine to be employed in the chlorination will vary depending upon the type of product desired. In carrying out the chlorination to obtain bis(chloromethyl) ether as the major proportion of the chlorinated product, a total or overall molar ratio corresponding to from 0.5 to 0.65 preferably from 0.5 to 0.6, gram molecular proportion of the dimethyl ether per gram molecular equivalent proportion of the chlorine is usually employed. Chlorination of the dimethyl ether is carried out in continuous manner, preferably to obtain chloromethyl methyl ether as the principal product of the chlorination, employing an overall molar ratio of at least 0.8, usually from 1.1 to 10, preferably from 2 to 5, gram molecular proportions of the dimethyl ether per gram molecular equivalent proportion of the chlorine.

The invention is illustrated more particularly with reference to the accompanying drawing, wherein.

Figure 1:
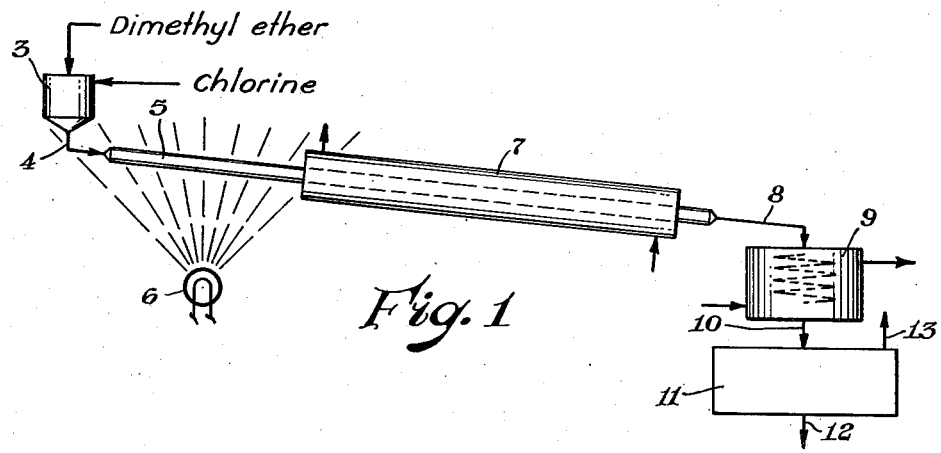
Fig. 1 is a schematic drawing showing an arrangement of apparatus suitable for practice of the invention.

In Fig. 1 of the drawing, the numeral 3 indicates a mixing chamber having suitable inlets for feed of dimethyl ether and chlorine thereto. The walls of the mixing chamber 3 are preferably opaque, or nearly opaque, to actinic light, e. g. from the lamp 6. A conduit 4 connects the outlet of mixing chamber 3 with reactor 5, suitably a quartz or glass tube. A portion of the length of reactor 5 near the feed end is exposed to light rays from an electric lamp 6, or other suitable source of light such as a mercury vapor lamp, or an S–1 sunlamp. A following portion of the reactor 5 is surrounded by jacket 7 having a suitable inlet and an outlet for passage of a heating or cooling medium, e. g. steam, water or brine, therethrough. The walls of the jacket 7, or of the portion of the reactor tube 5 situated therein, are preferably opaque, or nearly opaque, to actinic light. The discharge end of reactor 5 is connected to conduit 8 leading to a condenser, or heat exchanger 9. The condenser 9 is connected by conduit 10 to vessel 11 having an outlet 12 and a vent 13.

Figure 2:
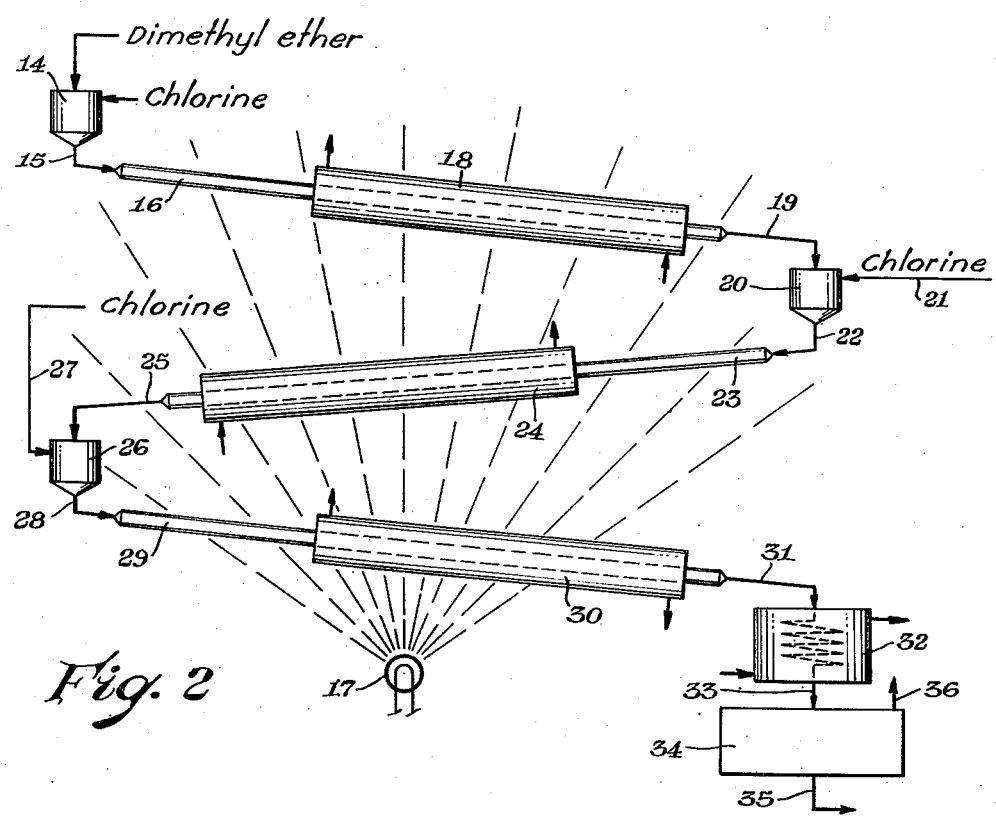
Fig. 2 is a schematic drawing showing an arrangement of apparatus for practice of the invention employing an alternative procedure, namely, the concurrent feed of chlorine into admixture with the dimethyl ether at a plurality of points in the process.

In Fig. 2 of the drawing, the numeral 14 indicates a mixing chamber having suitable inlets for feed of chlorine and dimethyl ether thereto. The outlet of mixing chamber 14 is connected by conduit 15 to reactor 16, which reactor can suitably be a quartz or glass tube having a portion of its length near the feed end exposed to light rays from an electric lamp 17, and a following portion of its length surrounded by a jacket 18 having an inlet and an outlet for passage of a heating or cooling medium through the annular chamber between the jacket 18 and a portion of the length of reactor 16 toward the discharge end. The discharge end of reactor 16 connects to conduit 19 leading to mixing chamber 20 having an inlet 21 for feed of chlorine thereto and an outlet 22 leading to reactor 23. Reactor 23 may comprise a quartz or glass tube having a portion of its length near the feed end exposed to light rays from lamp 17 and a following portion of its length surrounded by jacket 24 having an inlet and an outlet for passage of a heating or cooling medium therethrough. The discharge end of reactor 23 is connected by conduit 25 to mixing chamber 26, having an inlet 27 and an outlet 28 connected to reactor 29. The walls of the mixing chambers 14, 20 and 26, and of the jackets 18, 24 and 30 or of the portions of the reactor tubes 16, 23 and 29 situated therein, are preferably opaque, or nearly opaque, to actinic light. Reactor 29, suitably a quartz or glass tube, has a portion of its length near the feed end exposed to light rays from electric lamp 17 and a following portion of its length surrounded by jacket 30 having an inlet and an outlet for passage of a heating or cooling medium into contact with a portion of the length of reactor 29. The discharge end of reactor 29 is connected to conduit 31 leading to condenser 32. The condenser 32 is connected to conduit 33 leading to vessel 34 having an outlet 35 and a vent 36.

It is important that the dimethyl ether and the chlorine be rapidly and uniformly mixed with one another under non-reactive or substantially non-reactive conditions in order that the velocity of the reaction, subsequently initiated by subjecting the gaseous mixture to the catalytic action of light, can readily be controlled. The initial mixing of the dimethyl ether and the chlorine is usually accomplished with little, if any, chlorination occurring by concurrently feeding the dimethyl ether and the chlorine into admixture with one another in darkness, or in the substantial absence of light, preferably at room temperature or below, e. g. at temperatures between −20° and 25° C., and in proportions corresponding to at least 2 gram molecular proportions of the dimethyl ether per gram molecular equivalent proportion of the chlorine. The chlorine gas is usually fed into admixture with a stream of the dimethyl ether vapors so as to avoid forming a gaseous mixture containing an excess of the chlorine. The chlorine can be fed into admixture with a stream of the dimethyl ether vapors in the desired proportion in one or a plurality of streams, or concurrently fed as separate streams of the chlorine into admixture with a stream of the dimethyl ether and the stream of the vapors of the reacted materials containing dimethyl ether, in the absence of a liquid medium or diluent other than the reactants or products of the reaction, at a plurality of points each separated from one another by a reaction zone and under non-reactive or substantially non-reactive conditions as illustrated by the multi-step process shown in Fig. 2 of the drawing.

It is important that the initial gaseous mixture of reactants contain a molar excess of the dimethyl ether corresponding to at least 2 gram molecular proportions of the dimethyl ether per gram molecular equivalent proportion of the chlorine, in order that the chlorination can readily be initiated by the catalytic action of light and is completed, i. e. continued until all or substantially all of the chlorine is consumed in the reaction, without hazard, or danger of burning of the gaseous mixture. If desired, a further amount of chlorine can then be introduced and reacted, e. g. as illustrated in Fig. 2 of the drawing.

Thus, a vapor feed mixture of at least 2, preferably from 2 to 10, molecular equivalents of dimethyl ether per mole of chlorine is employed in a single step chlorination, e. g. using the apparatus of Fig. 1. A similar vapor mixture is fed to the first of the reactors employed in a multi-step chlorination procedure, e. g. to the reactor 16, of Fig. 2, but further amounts of chlorine may concurrently be added at other stages in the procedure. Usually an amount of the chlorine corresponding to from one-fourth to one-half of the total chlorine employed is initially mixed with the dimethyl ether in a first mixing chamber in a multi-step process. After reaction of the initial gaseous mixture of chlorine and dimethyl ether in a multi-step process, the chlorine can be fed into admixture with the reacted gaseous materials containing dimethyl ether in somewhat larger proportions in succeeding steps without hazard, or burning of the vapors. The overall or total molar ratio of dimethyl ether to chlorine employed in the reaction can be as low as 0.5 mole of the dimethyl ether per mole of the chlorine, i. e. in amount corresponding to that theoretically required to produce bis(chloromethyl) ether, when the chlorination is carried out in a plurality of succeeding steps.

In carrying out the chlorination of dimethyl ether employing an arrangement of apparatus similar to that shown in Fig. 1 of the drawing, dimethyl ether and chlorine are concurrently fed to mixing chamber 3 under non-reactive conditions in the absence or substantial absence of light or a catalyst, usually at room temperature or below, e. g. at temperatures between −20° and 25° C. The gaseous mixture flows through conduit 4 into reactor 5 where it is exposed to light from electric lamp 6 and the chlorination reaction is thereby initiated. The light is of an intensity sufficient to start the chlorination reaction without causing it to occur as a luminous flame. The mixture flows from the illuminated section of reaction tube 5 through a jacketed section of the tube where the mixture is, or becomes, heated to temperatures between 80° and 200° C. and the reaction continues at a rapid rate. In some instances, heat generated by the reaction is sufficient to bring the mixture to temperatures in this range and external cooling may be required. In other instances, e. g. when employing a high molecular ratio of dimethyl ether to chlorine, external heating may be required. The temperature is controlled by passage of a heating or cooling fluid through the jacket 7 over a section of the reactor tube 5.

The reacted gaseous materials flow via conduit 8 to condenser 9, suitably cooled with brine, and are cooled to condense liquid products. The cooled materials pass via conduit 10 into vessel 11, wherein the condensate or liquid product is collected and gaseous substances are withdrawn through vent 13. The liquid product is withdrawn from vessel 11 via outlet 12 and is distilled to separate and recover the components, e. g. chloromethyl methyl ether.

In carrying out the chlorination of dimethyl ether employing an arrangement of apparatus similar to that shown in Fig. 2 of the drawing, dimethyl ether is fed to the reaction via an inlet to mixing chamber 14, while separate streams of chlorine are concurrently fed to the reaction and into admixture with the dimethyl ether vapors in each of the mixing chambers 14, 21 and 26, in the desired proportion. The chlorination is carried out in continuous manner and in any desired plurality of steps, employing the chlorine and the dimethyl ether in proportions as hereinbefore stated and carrying out of the reaction as herein described.

The gaseous mixture should not be maintained at reaction temperatures between 80° and 200° C. for a time which results in decomposition of the chlorinated product. It may be mentioned that the tendency toward the formation of undesirable by-products such as formaldehyde or paraformaldehyde in the reaction becomes greater as the chlorination is carried out at the higher temperatures, e. g. between 150° and 200° C., within the range herein stated, than at lower temperatures of from 80° to 120° C. The tendency toward decomposition of the chlorinated product becomes greater at such higher reaction temperatures, and with increase in the reaction time. By reaction time is meant the time required for an infinitesimal portion of the gaseous mixture of dimethyl ether and chlorine fed to the reaction to pass through a reactor or reaction zone from point of feed of the gaseous mixture thereto to point of discharge of the reacted gaseous materials therefrom. In general, a reaction time of from 0.1 to 15 seconds, which reaction time is inversely proportional to an increase in the reaction temperature within the range of from 80° to 200° C., is satisfactory. The optimum reaction time is dependent in part upon the temperature employed. The chlorination can be carried out at higher temperatures up to 350° C., but the reaction is difficult to control and usually results in the formation of large amounts of undesirable by-products such as formaldehyde or para-formaldehyde and low yields of the chlorinated product. For these reasons the chlorination of dimethyl ether is carried out as herein described at temperatures between 80° and 200° C., preferably from 90° to 120° C., in a reaction time between 0.1 and 15 seconds, preferably between 0.45 and 2.3 seconds, and at atmospheric or substantially atmospheric pressure.

The following examples illustrate ways in which the principle of the invention has been applied, but are not to be construed as limiting its scope.

Example 1

In an experiment for carrying out the chlorination of dimethyl ether employing an arrangement of apparatus similar to that shown in Fig. 1 of the drawing, chlorine gas was fed into admixture with a stream of dimethyl ether vapors in darkness at room temperature in a mixing chamber comprising a 1-inch diameter glass tube 4 inches long substantially filled with 1/8-inch glass helices and equipped with an outlet for the gaseous mixture. The dimethyl ether was fed to the mixing chamber at a rate corresponding to 680 cc. of the gaseous dimethyl ether per minute at 25° C. and 760 millimeters absolute pressure. The chlorine was fed to the mixing chamber at a rate corresponding to 200 cc. of chlorine gas per minute at 25° C. and 760 millimeters absolute pressure. The molar ratio of dimethyl ether to chlorine fed to the reaction was 2.3 moles of the dimethyl ether per mole of the chlorine, on a gram molecular weight basis. The gaseous mixture was passed via an outlet from the mixing chamber into a reactor comprising a 1-centimeter diameter glass tube approximately 36 centimeters long having an internal volume of 28 cubic centimeters. The gaseous mixture was subjected to the catalytic action of light from a 40-watt frosted electric light bulb, during passage of the gaseous mixture through a distance corresponding to approximately 15 centimeters of the length of the tubular glass reactor from the feed end, to initiate chlorination of the dimethyl ether. The light bulb was placed at a distance of approximately 16 centimeters from the reactor. After exposure to the light, the reacting gaseous mixture passed through a section of the glass reactor (which section was approximately 18 centimeters long, was shielded from the light, and was immersed in a water bath maintained at temperatures between 90° and 95° C.) wherein the chlorination was completed. Thereafter, the gaseous reacted materials were cooled to condense the liquid product. The reaction was carried out in continuous manner for a period of 1.25 hours. A total of 105.8 grams (2.3 moles) of dimethyl ether and 71 grams (1 mole) of chlorine were fed to the reaction. The reaction time was about 1.27 seconds. By reaction time is meant the time required for an infinitesimal portion of the feed gaseous mixture of dimethyl ether and chlorine to pass through the 1-centimeter diameter glass reactor from point of feed to point of discharge of the reacted gaseous materials. The liquid product obtained in the reaction was collected and was fractionally distilled. There were obtained 52 grams (1.13 moles) of unreacted dimethyl ether, 69.2 grams (0.86 mole) of chloromethyl methyl ether and 7.2 grams (0.06 mole) of bis(chloromethyl) ether. The yield of chloromethyl methyl ether was 86 percent based on the chlorine fed to the reaction. No by-product formaldehyde was obtained in the reaction.

Example 2

Dimethyl ether and chlorine were reacted with one another employing a procedure similar to that described in Example 1, while feeding the dimethyl ether and chlorine to the reaction in proportion corresponding to three gram molecular proportions of the dimethyl ether per gram molecular proportion of the chlorine. The chlorination was carried out at temperatures between 90° and 100° C. and for a reaction time of about 1.55 seconds. The yield of chloromethyl methyl ether was 94.5 percent based on the clorine fed to the reaction. Only a trace amount of by-product formaldehyde was obtained.

Example 3

The experiment described in Example 2 was repeated, except that the reaction was carried out at temperatures between 95° and 100° C. and for a reaction time of about 0.9 second. The yield of chloromethyl methyl ether was 85 percent, based on the chlorine fed to the reaction.

Example 4

Dimethyl ether and chlorine were reacted with one another, employing a procedure similar to that described in Example 1, while feeding the dimethyl ether and chlorine to the reaction in proportions corresponding to 3 gram molecular proportions of the dimethyl ether per gram molecular proportion of the chlorine and at a rate such that the gaseous mixture was subjected to a reaction time of about 0.7 second. The reaction was carried out at temperatures between 175° and 200° C. There was obtained 56.4 grams (0.7 mole) of chloromethyl methyl ether per gram mole of chlorine fed to the reaction. A small amount of by-product formaldehyde was also obtained.

In contrast, when the chlorination was carried out in similar manner at temperatures between 210° and 225° C., and for a reaction time of about 2.5 seconds, the yield of chloromethyl methyl ether was only 33 percent, based on the chlorine fed to the reaction. A small amount of by-product formaldehyde was also obtained.

Example 5

In each of a series of experiments for the chlorination of dimethyl ether, there was employed an arrangement of apparatus similar to that shown in Fig. 2 of the drawing. The apparatus comprised in combination, a series of four units each consisting of a glass mixing chamber 2.5 centimeters in diameter by 15 centimeters long (substantially filled with 1/8-inch glass helices) having suitable inlets for feed of dimethyl ether and chlorine thereto and an outlet. The outlet to the mixing chamber was connected to a 1-centimeter internal diameter glass tube 90 centimeters long having approximately 30 centimeters of its length from the feed end exposed and about 60 centimeters of its length toward the discharge end surrounded by a jacket with a suitable inlet and an outlet for feed of a heating or cooling medium therethrough. The four units were connected together so as to provide a continuous pasageway for flow of a gaseous mixture of dimethyl ether and chlorine from a first mixing chamber into the exposed portion of a glass tubular reactor, thence through the jacketed portion of the reactor and into a second mixing chamber, wherein a further quantity of chlorine was fed into admixture with the reacted vapors containing dimethyl ether. The resulting gaseous mixture was passed into the exposed portion of a second tubular reactor, thence through the jacket portion of the reactor and passed into a third mixing chamber, etc. The gaseous reacted material was dicharged from the tubular reactor of the last unit and passed through a heat exchanger wherein it was cooled to condense and separate the liquid product. The liquid product was collected and fractionally distilled to separate and recover the components.

In the experiments, dimethyl ether was fed to the first mixing chamber at room temperature at a rate as stated in the following table. An electric lamp, placed adjacent to the apparatus so that rays therefrom illuminated the exposed portion of each of the glass tubes, was turned on. Thereafter, chlorine gas at room temperature was concurrently fed into admixture with the vapors of dimethyl ether, or partially chlorinated dimethyl ether, in each of the mixing chambers in the absence of light. An amount of the chlorine was fed to the reaction in each mixing chamber corresponding to approximately one-fourth of the total amount of the chlorine employed. Each experiment was carried out with continuous feed of the dimethyl ether and chlorine to the reaction at rates as stated in the table over a period of 2 hours. After mixing of the chlorine and the dimethyl ether in darkness in the respective mixing chambers the gaseous mixture was subjected to the catalytic action of light from the electric lamp in the exposed portion of the glass reactors to initiate chlorination of the dimethyl ether. The temperature of the chlorination was regulated by passing water at temperatures between 90° and 95° C. through the jacket of each reactor. The reacted gaseous material was passed from the last reactor through a condenser wherein it was cooled to condense and separate the liquid product. The liquid product was collected and fractionally distilled to separate the components, e. g. chloromethyl methyl ether and bis(chloromethyl) ether. Table I identifies the experiments and gives the rates of flow of dimethyl ether and chlorine fed to the reaction in cubic centimeters of the gases per minute at 25° C. and 760 millimeters absolute pressure. The table gives the mole ratio of dimethyl ether per mole of the chlorine fed to the first or initial mixing chamber and the total or overall mole ratio of dimethyl ether to chlorine employed in the experiment. The table also gives the gram molecular proportion of chloromethyl methyl ether and bis (chloromethyl) ether obtained in each experiment and the percent yields of said products per gram molecular equivalent proportion of chlorine fed to the reaction.

concurrently fed into each of the four mixing chambers at a total rate corresponding to 860 cc. per minute of the chlorine gas at 25° C. and 760 millimeters absolute pressure. Approximately one-fourth of the total chlorine was fed to each mixing chamber and into admixture with the dimethyl ether vapors in darkness. Chlorination of the dimethyl ether was initiated upon subjecting the gaseous mixture to the catalytic action of light as it flowed through the exposed portions of each reactor adjacent to the mixing zones. The temperature of the reaction was controlled by passing water at temperatures between 90° and 95° C. through the jackets of the reactors. The gaseous reacted material was cooled, after discharge from the last reactor, to condense the liquid product. The latter was collected and fractionally distilled to separate and recover the components. The experiment was carried out in continuous manner for a period of 2 hours. A total of 174.8 grams (3.8 moles) of dimethyl ether and 326.6 grams (4.6 moles) of chlorine were fed to the reaction. There were obtained 241.5 grams (3.0 moles) of chloromethyl methyl ether, 79.3 grams (0.69 mole) of bis(chloromethyl) ether and 10.0 grams (0.088 mole) of dichloromethyl methyl ether.

I claim:

1. A process for chlorinating dimethyl ether which comprises reacting chlorine gas with dimethyl ether vapors in a plurality of succesive steps which consist in (1) feeding chlorine gas into admixture with a stream of vapors comprising dimethyl ether, in the substantial absence of a liquid medium and diluent gases other than the reactants and products of the reaction and in the absence of a catalyst, in amount such that the molar ratio of dimethyl ether to chlorine in the initial gaseous mixture of the reactants corresponds to at least 2 gram molecular proportions of the dimethyl ether per gram molecular equivalent proportion of the chlorine, subjecting the gaseous mixture to the catalytic action of an amount of light sufficient to initiate chlorination of the dimethyl ether vapors without burning of the gases and continuing the chlorination in the substantial absence of a liquid medium and in the absence of a catalyst at reaction temperatures between 80° and 200° C., for a time sufficient to cause reaction of a major amount of the chlorine, (2) feeding a further amount of chlorine into admixture with the stream of reacted gaseous materials in the substantial absence of a liquid medium and in the absence of a catalyst, subjecting the resulting gaseous mixture to the catalytic action of an amount of light sufficient to initiate chlorination of

TABLE I

| Run No. | Reactants | | | | Products | | | |
|---|---|---|---|---|---|---|---|---|
| | Dimethyl Ether, cc./min. | Chlorine, cc./min. | Mole Ratio of Dimethyl Ether to Chlorine | | Mole Chloro-Methyl Methyl Ether | Mole Bis (Chloro-Methyl) Ether | Percent Yield Chloro-Methyl Methyl Ether | Percent Yield Bis (Chloro-Methyl) Ether |
| | | | Initial | Total | | | | |
| 1 | 520 | 560 | 3.7 | 0.93 | 0.81 | 0.04 | 81 | 8 |
| 2 | 970 | 1,200 | 3.2 | 0.82 | 0.64 | 0.12 | 64 | 24 |
| 3 | 455 | 605 | 3.0 | 0.76 | 0.53 | 0.17 | 53 | 34 |
| 4 | 755 | 1,075 | 2.8 | 0.70 | 0.41 | 0.20 | 41 | 40 |
| 5 | 325 | 480 | 2.7 | 0.68 | 0.36 | 0.22 | 36 | 44 |
| 6 | 990 | 1,560 | 2.5 | 0.64 | 0.27 | 0.26 | 27 | 52 |
| 7 | 530 | 860 | 2.4 | 0.61 | 0.23 | 0.29 | 23 | 58 |
| 8 | 605 | 1,210 | 2.0 | 0.50 | 0.07 | 0.29 | 7 | 58 |

*Example 6*

Dimethyl ether was fed to the first mixing chamber of the apparatus described in Example 5, at a rate corresponding to 710 cc. of the dimethyl ether gas per minute at 25° C. and 760 millimeters absolute pressure. The ether was passed through the apparatus for a period of two minutes to sweep air from the system. Thereafter, the electric lamp was turned on and chlorine gas was the vapors without burning of the gases and continuing the chlorination in the substantial absence of a liquid medium and in the absence of a catalyst at temperatures between 80° and 200° C., for a time sufficient to cause reaction of a major amount of the chlorine, (3) repeating the sequence of operations described in step (2), the total proportions of chlorine and dimethyl ether fed to the reaction corresponding to an overall molar ratio of dimethyl ether to chlorine of from 0.5:1 to 0.93:1 and cooling the reacted gaseous materials to condense and separate the chlorinated dimethyl ether products.

2. A process as claimed in claim 1, wherein the chlorination of the dimethyl ether is carried out in a plurality of at least four succeeding steps.

3. A process for chlorinating dimethyl ether which comprises reacting chlorine gas with dimethyl ether vapors in a plurality of successive steps which consist in (1) feeding chlorine gas into admixture with a stream of dimethyl ether vapors, in the substantial absence of a liquid medium and diluent gases other than the reactants and products of the reaction and in the absence of a catalyst, in amount such that the molar ratio of dimethyl ether to chlorine in the initial gaseous mixture corresponds to at least 2 gram molecular proportions of the dimethyl ether per gram molecular equivalent proportion of the chlorine, subjecting the gaseous mixture to the catalytic action of an amount of light sufficient to initiate chlorination of the dimethyl ether vapors without burning of the gases, and continuing the chlorination in the substantial absence of a liquid medium and in the absence of a catalyst at reaction temperatures between 90° and 120° C., for a time sufficient to cause reaction of a major amount of the chlorine, (2) feeding a further quantity of chlorine gas into admixture with the stream of the reacted gaseous materials in the substantial absence of a liquid medium and in the absence of a catalyst, subjecting the resulting gaseous mixture to the catalytic action of an amount of light sufficient to initiate chlorination of the vapors without burning of the gases, continuing the chlorination in the substantial absence of a liquid medium and diluent gases other than the reactants and products of the reaction and in the absence of a catalyst, at temperatures between 90° and 120° C. for a time sufficient to cause reaction of a major amount of the chlorine, and (3) repeating the sequence of operations described in step (2), the total proportions of chlorine and dimethyl ether fed to the reaction corresponding to an overall molar ratio of dimethyl ether to chlorine of from 0.5:1 to 0.93:1 and cooling the reacted gaseous materials to condense and separate the chlorinated dimethyl ether products.

4. A process as claimed in claim 3, wherein the chlorination of the dimethyl ether is carried out in a plurality of at least four succeeding steps.

References Cited in the file of this patent
UNITED STATES PATENTS 2,065,400     Salzberg et al. _____ Dec. 22, 1936

FOREIGN PATENTS 857,949     Germany _____ Dec. 4, 1952

OTHER REFERENCES

Friedel, Comptes Rendu, vol. 84 (1877), pp. 247–250.